United States Patent
Waldron et al.

(10) Patent No.: US 11,488,454 B2
(45) Date of Patent: Nov. 1, 2022

(54) OBSTRUCTION DETECTION OF A TRANSACTION DEVICE DISPLAY SCREEN

(71) Applicant: Capital One Services, LLC, McLean, VA (US)

(72) Inventors: Michael Waldron, Brooklyn, NY (US); David Kelly Wurmfeld, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 163 days.

(21) Appl. No.: 17/247,100

(22) Filed: Nov. 30, 2020

(65) Prior Publication Data

US 2022/0172583 A1    Jun. 2, 2022

(51) Int. Cl.
*G07F 9/00* (2006.01)
*G09G 5/10* (2006.01)
*G07F 19/00* (2006.01)

(52) U.S. Cl.
CPC ............ *G07F 19/209* (2013.01); *G07F 9/009* (2020.05); *G09G 5/10* (2013.01); *G09G 2360/144* (2013.01)

(58) Field of Classification Search
CPC ................................ G07F 19/209; G06F 3/14
See application file for complete search history.

(56) References Cited

U.S. PATENT DOCUMENTS

| | | | |
|---|---|---|---|
| 9,449,561 B1* | 9/2016 | Umansky | G09G 5/003 |
| 2012/0074217 A1* | 3/2012 | Block | G07F 19/205 |
| | | | 235/379 |
| 2014/0191110 A1* | 7/2014 | Holenarsipur | G06F 3/0421 |
| | | | 250/206 |
| 2015/0084997 A1* | 3/2015 | Kim | G09G 3/3648 |
| | | | 345/690 |
| 2018/0150838 A1* | 5/2018 | Ausems | G06Q 20/4012 |

FOREIGN PATENT DOCUMENTS

| | | | | | |
|---|---|---|---|---|---|
| CA | 2508130 C | * | 6/2011 | ............. | G07F 19/20 |
| DE | 102008031281 A1 | * | 1/2010 | ............. | G07F 19/20 |
| JP | 2009244345 A | * | 10/2009 | | |
| JP | 6290373 B2 | * | 3/2018 | ............. | H05B 31/50 |

OTHER PUBLICATIONS

"IR (Infrared) Obstacle Detection Sensor Circuit," Electronics Hub, Feb. 2, 2015, 12 Pages, Website: https://www.electronicshub.org/ir-sensor/.

* cited by examiner

*Primary Examiner* — Christle I Marshall
(74) *Attorney, Agent, or Firm* — Harrity & Harrity, LLP (57) ABSTRACT

In some implementations, a transaction device may include a display screen, at least one photosensitive sensor configured to detect a luminance of a viewing surface of the display screen, and one or more processors. The one or more processors may be configured to monitor an output of the at least one photosensitive sensor, determine that the output is indicative of an obstruction on the display screen based on the output indicating a change to the luminance of the viewing surface of the display screen, and disable one or more operations of the transaction device based on determining that the output is indicative of the obstruction on the display screen.

20 Claims, 6 Drawing Sheets

OBSTRUCTION DETECTION OF A TRANSACTION DEVICE DISPLAY SCREEN

BACKGROUND

A transaction device may include an automated teller machine (ATM) device, a point of sale (POS) device, and/or a kiosk device, among other examples. A user of a transaction device may conduct a variety of transactions via the transaction device, such as receiving money, receiving a cashier's check, depositing money, and/or checking an account balance, among other examples.

SUMMARY

In some implementations, a transaction device capable of obstruction detection includes a display screen, at least one photosensitive sensor configured to detect a luminance of a viewing surface of the display screen, and one or more processors configured to: monitor an output of the at least one photosensitive sensor; determine that the output is indicative of an obstruction on the display screen based on the output indicating a change to the luminance of the viewing surface of the display screen; and disable one or more operations of the transaction device based on determining that the output is indicative of the obstruction on the display screen.

In some implementations, a method of obstruction detection includes monitoring, by a device, an output of at least one photosensitive sensor configured to detect a luminance of a viewing surface of a display screen of the device; determining, by the device, that the output is indicative of an obstruction on the display screen based on the output indicating a change to the luminance of the viewing surface of the display screen; and performing, by the device, one or more actions based on determining that the output is indicative of the obstruction on the display screen.

In some implementations, a non-transitory computer-readable medium storing a set of instructions includes one or more instructions that, when executed by one or more processors of a device, cause the device to: receive, from at least one photosensitive sensor configured to detect a luminance of a viewing surface of a display screen, information indicating a change to the luminance of the viewing surface of the display screen; and disable one or more operations of the device based on receiving the information indicating the change to the luminance.

DETAILED DESCRIPTION

The following detailed description of example implementations refers to the accompanying drawings. The same reference numbers in different drawings may identify the same or similar elements.

An institution may provide a transaction device, such as an ATM or a kiosk device, to allow users to conduct a variety of transactions. In some cases, the transaction device may permit user interaction via a mobile device. For example, the user may use the mobile device to scan a quick response (QR) code that is displayed by the transaction device. This may cause the mobile device to open a particular webpage and/or a particular application where the user can enter credentials, access account data, and/or perform a transaction, among other examples.

Often, the transaction device is available for public use and with limited supervision by personnel of the institution. Thus, the transaction device, and in particular a display screen of the transaction device, may be vulnerable to tampering and vandalism. Since the display screen of the transaction device is merely an output device, it may be difficult for the institution to monitor for tampering and vandalism without frequent visual inspection by the institution's personnel.

In one example of tampering, a fraudulent actor may place a sticker that depicts a fraudulent QR code on the display screen of the transaction device, such that the sticker obscures an actual QR code displayed by the transaction device. The user may use the mobile device to mistakenly scan the fraudulent QR code instead of the actual QR code, which may cause the mobile device to open a malicious webpage and/or download a malicious application, among other examples. As a result, the user may unknowingly provide credentials and/or account information, among other examples, to the fraudulent actor, which the fraudulent actor may use to perform unauthorized transactions. Unauthorized transactions may cause millions or billions of dollars in additional expenses for the institution as well as expend computing and/or network resources involved in identifying, investigating, and/or correcting fraudulent activity.

Some implementations described herein enable the detection of obstructions placed on a display screen of a transaction device. In some implementations, the transaction device may include at least one photosensitive sensor that is configured to detect a luminance of a viewing surface of the display screen. The transaction device may monitor the photosensitive sensor(s) to determine whether the luminance of the display screen changes, thereby indicating that an obstruction (e.g., a sticker) may be on the display screen. The transaction device, based on determining that an obstruction may be on the display screen, may perform actions, such as disabling one or more operations of the transaction device, to prevent or ameliorate fraudulent activity. Therefore, the transaction device may conserve any computing resources (e.g., processing resources, memory resources, and/or power resources) and/or network resources involved in correcting any fraudulent activity that would have been allowed without the use of the transaction device described herein. Moreover, the photosensitive sensor may consume relatively little power, can be integrated into a small package, and may enable obstruction detection without the need for complex systems.

Figure 1A:
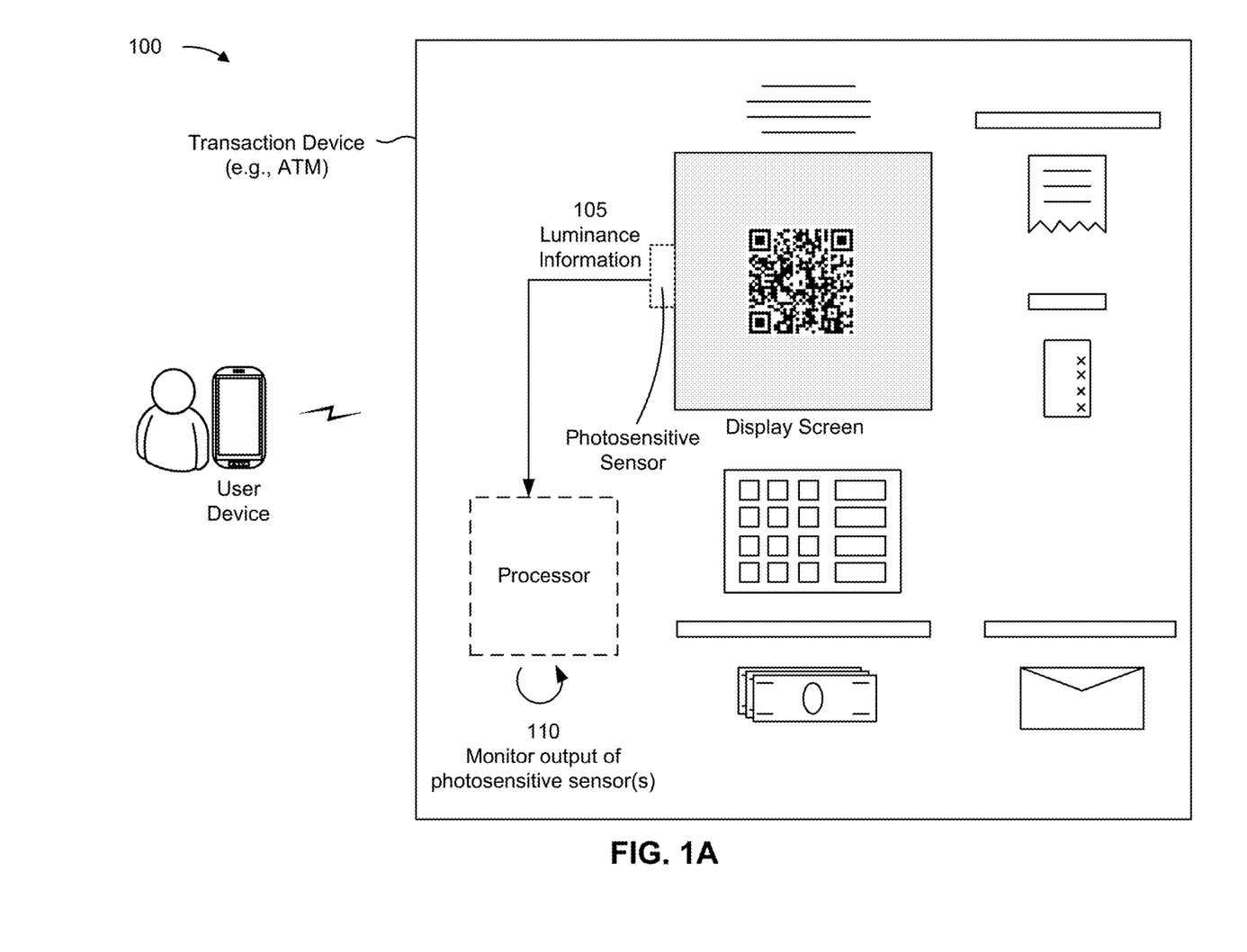
FIGS. 1A-1C are diagrams of an example implementation relating to obstruction detection of a transaction device display screen.
Figure 1B:
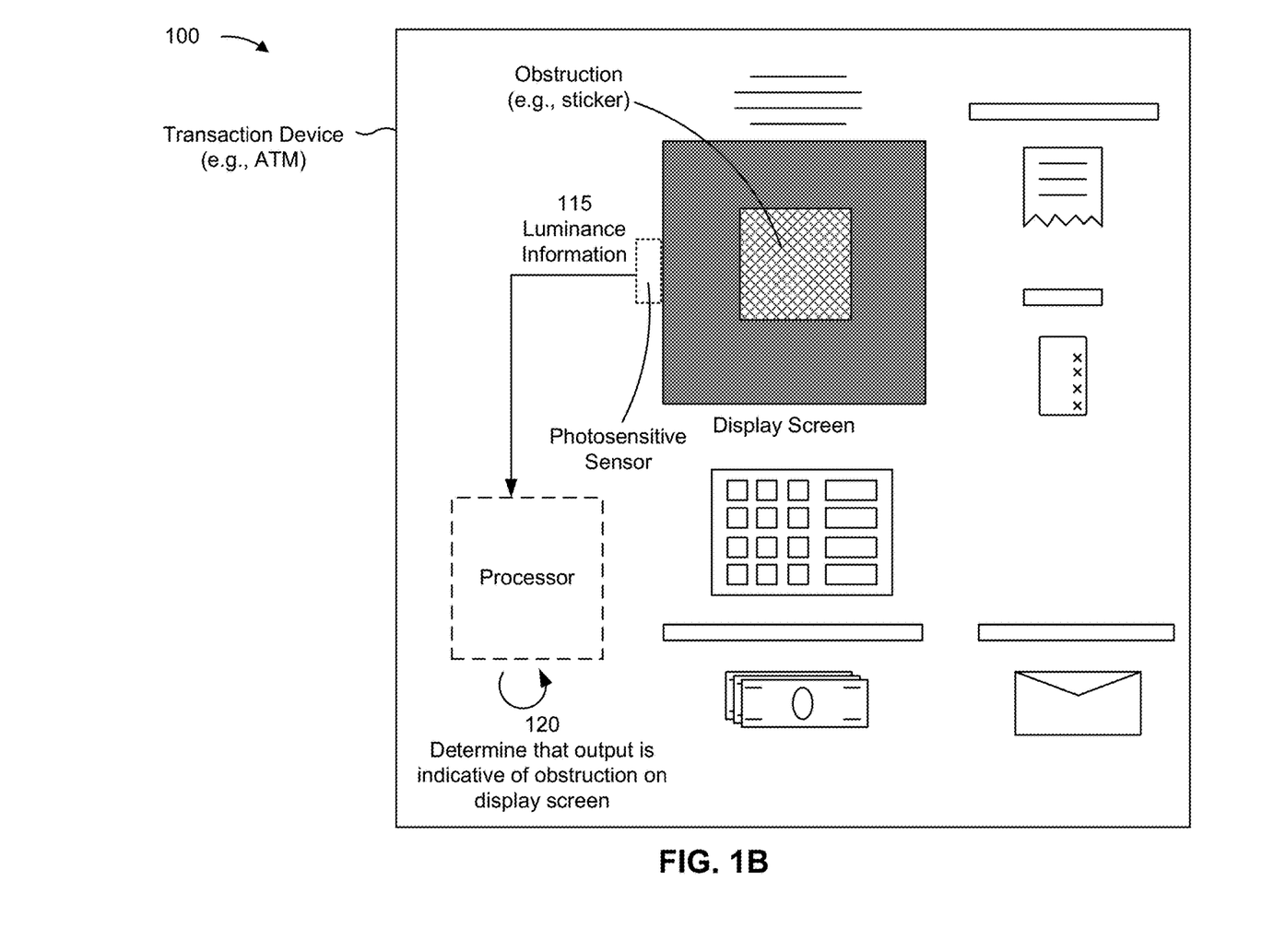
Figure 1C:
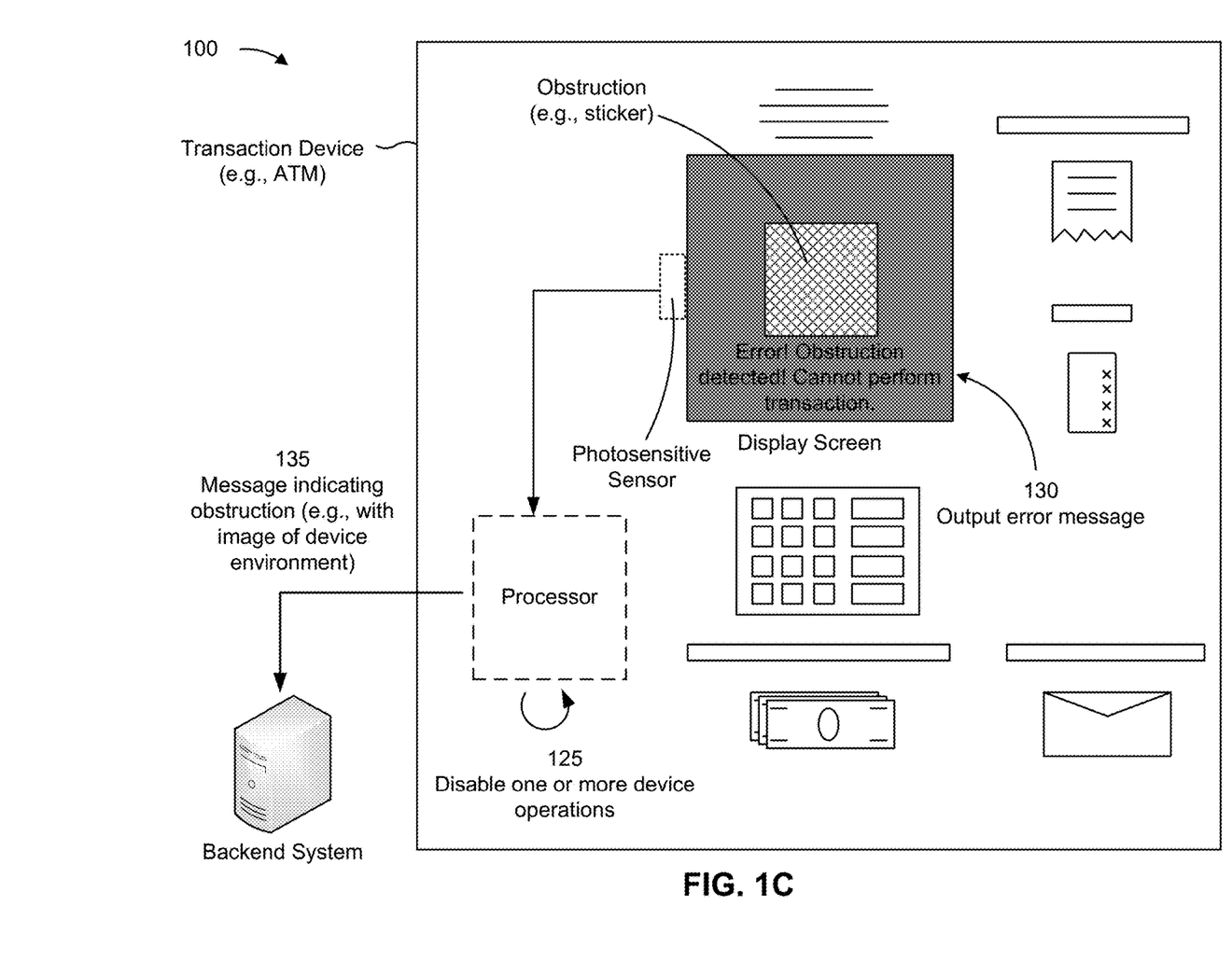

FIGS. 1A-1C are diagrams of an example 100 associated with obstruction detection of a transaction device display screen. As shown in FIGS. 1A-1C, example 100 includes a transaction device, a user device of a user interacting with the transaction device, and a backend system (which may include one or more devices). These devices are described in more detail in connection with FIGS. 2 and 3.

The transaction device may include an ATM, a kiosk device, such as a cashier's check kiosk, or another publicly-accessible transaction device. As shown in FIGS. 1A-1C, the transaction device may include a display screen, at least one photosensitive sensor, and/or a processor. The display screen may be configured to display information for the user. For example, the display screen may display a visual code (e.g., a two-dimensional code, such as a QR code, a PDF417 code, a data matrix code, a GS1 composite code, a MaxiCode code, and/or an Aztec code, among other examples) used for authentication (e.g., multi-factor authentication) of the user or the user device. In some implementations, the transaction device may receive, from the user device, a request to authenticate the user device (e.g., a request to access account data via the user device and/or a request to execute a transaction via the user device, among other examples), and the transaction device may display a code in response to the request. The user device may scan (e.g., capture an image of) the code, which may direct the user device to a resource, such as a webpage (e.g., where the user can enter credentials for the transaction and/or configure a transaction with the transaction device), an application download, and/or an authenticator application, among other examples.

The display screen of the transaction device may be an edge-lit display screen. That is, the display screen may include a lightguide and a plurality of light sources (e.g., light-emitting diodes (LEDs)) located at one or more edges of the lightguide. In this example, internal reflection within the lightguide of light emitted from the light sources provides illumination of the display screen. In some implementations, the display screen is a back-lit display screen, or a display screen illuminated by another technique. The display screen may be associated with a baseline luminance (e.g., within a tolerance of, for example, ±1%), which is a luminance of the display screen when there is no obstruction on the display screen. For example, an edge-lit display screen used for a single application (e.g., displaying QR codes) may be associated with a relatively constant baseline luminance (e.g., within a threshold tolerance).

A photosensitive sensor (which also may be referred to as a photosensor) may include a phototransistor, a photoresistor, and/or a photodiode, among other examples. The photosensitive sensor may be configured to detect a degree of luminance (e.g., a luminance level, a light intensity level, or a quantity of lumens) associated with a viewing surface of the display screen. One or more photosensitive sensors may be located at an edge of the display screen, in front of the viewing surface of the display screen, and/or behind the viewing surface of the display screen. For example, one or more photosensitive sensors may be located at one or more edges of the display screen, such as an edge of the display screen that is free of a light source for the display screen. In this configuration, the luminance to be measured by a photosensitive sensor may include a luminance of reflected light in the display screen (e.g., the lightguide). Here, the luminance detected by a photosensitive sensor would increase when there is an obstruction on the display screen because the obstruction would prevent some light from escaping the display screen. As another example, one or more photosensitive sensors may be positioned in front of the viewing surface of the display screen. In this configuration, the luminance to be measured by a photosensitive sensor may include a luminance of light emitted from the display screen. Here, the luminance detected by a photosensitive sensor would decrease when there is an obstruction on the display screen because the obstruction blocks some light. In some implementations, the transaction device may include one or more arms that project from the transaction device. An arm may have a distal end directed toward the viewing surface of the display screen, and one or more photosensitive sensors may be disposed on the distal end.

One or more photosensitive sensors may be included in a sensor module. The sensor module may include electrical components (e.g., amplifiers, resistors, and/or potentiometers) and circuitry associated with a photosensitive sensor. For example, the photosensitive sensor may be in a circuit with one or more potentiometers that enable a threshold value (e.g., a threshold voltage) to be set for triggering a particular output of the sensor module. Accordingly, the sensor module may be configured so that the circuit breaks when the luminance detected by the photosensitive sensor changes by a threshold amount. "Photosensitive sensor," as used herein, may refer to a sensor module.

As shown in FIG. 1A, and by reference number 105, the transaction device (e.g., using the processor) may receive an output of a photosensitive sensor. The output may include luminance information. The luminance information may include a signal (e.g., an analog signal or a digital signal) that indicates a degree of luminance detected by the photosensitive sensor. Additionally, or alternatively, the luminance information may include a signal (e.g., a digital signal) that indicates whether a luminance detected by the photosensitive sensor has changed (e.g., by a threshold amount) from the baseline luminance of the display screen. In some implementations, the transaction device may receive respective outputs of multiple photosensitive sensors. In some implementations, the transaction device may receive a single output that is representative of luminance detected by multiple photosensitive sensors (e.g., an average luminance, a maximum luminance, or a minimum luminance). Additionally, or alternatively, the transaction device may generate a single output, representative of luminance detected by multiple photosensitive sensors, based on multiple outputs received from those photosensitive sensors.

As shown in FIG. 1A, a first output of the photosensitive sensor may indicate no change in the luminance of the display screen. In this example, an amount of the change to the luminance from the baseline luminance does not satisfy a threshold value. For example, the first output may include a signal that indicates a detected luminance that is within a threshold amount of the baseline luminance for the display screen. As another example, the first output may include a signal (e.g., a low voltage signal) that indicates that a luminance detected by the photosensitive sensor has not changed (e.g., by a threshold amount) from the baseline luminance for the display screen.

As shown by reference number 110, the transaction device (e.g., using the processor) may monitor the output of the photosensitive sensor. In particular, the transaction device may monitor the output for luminance information that indicates a change to the luminance of the display screen from the baseline luminance. The transaction device may continuously monitor the output or may sample the output at regular or irregular intervals. In some implementations, the transaction device may monitor respective outputs of multiple photosensitive sensors. Additionally, or alternatively, the transaction device may monitor or generate a single output that is representative of luminance detected by multiple photosensitive sensors.

As shown in FIG. 1B, and by reference number 115, the transaction device may receive a second output of the photosensitive sensor that indicates a change to the luminance of the display screen. In this example, an amount of the change to the luminance from the baseline luminance satisfies a threshold value. For example, the second output may include a signal that indicates a detected luminance that is different from the baseline luminance for the display screen (e.g., by a threshold amount). As another example, the second output may include a signal (e.g., a high voltage signal) that indicates that a luminance detected by the photosensitive sensor has changed (e.g., by a threshold amount) from the baseline luminance for the display screen. As described above, the change to the luminance of the display screen may be due to the placement of an obstruction on the display screen. For example, the obstruction may be paper that is placed on the display screen, a sticker that is placed on the display screen, and/or a marking (e.g., from spray paint or a marker) that is placed on the display screen, among other examples. In some cases, the obstruction may be a printed code (e.g., on a sticker) that is placed on the display screen where the display screen ordinarily displays a code (e.g., a QR code) used for authentication.

As shown by reference number 120, the transaction device (e.g., using the processor) may determine that the output is indicative of an obstruction on the display screen. That is, the transaction device may determine that the output is indicative of the obstruction based on the output (e.g., the second output) indicating the change to the luminance of the display screen. For example, the transaction device may determine that the first output is different from the second output (e.g., by a threshold amount), thereby indicating the change to the luminance of the display screen. As another example, the transaction device may determine that the second output indicates a particular value that is indicative of the change to the luminance of the display screen.

In some implementations, the transaction device may determine that the output is indicative of the obstruction based on a determination that the output indicates the change to the luminance for a threshold amount of time (e.g., to reduce false positives, such as if the user's hand is temporarily placed on the display screen). For example, the transaction device may continuously receive a signal that indicates the change to the luminance for the threshold amount of time (e.g., when the output is continuously monitored) and/or the transaction device may receive consecutive signals, over the threshold amount of time, that indicate the change to the luminance (e.g., when the output is sampled). In some implementations, the transaction device may determine that the output is indicative of the obstruction based on a determination that the transaction device has received a threshold quantity of signals (e.g., over the threshold amount of time) that indicates the change to the luminance. In some implementations, the transaction device may determine that respective outputs of multiple photosensitive sensors are indicative of an obstruction on the display screen. For example, the obstruction may be indicated when a threshold quantity (or a threshold percentage) of the photosensitive sensors indicate a change to the luminance of the display screen.

One or more photosensitive sensors may detect a particular change of luminance that is associated with a luminance signature. In some implementations, a luminance signature may be a particular change to the luminance from the baseline luminance. Additionally, or alternatively, a luminance signature may be a particular pattern by which the luminance changes over time. Additionally, or alternatively, a luminance signature may be a particular pattern in changes to the luminance detected across multiple photosensitive sensors (e.g., a first sensor detects a 1% change in luminance, a second sensor detects a 7% change in luminance, and so forth, which defines a luminance signature).

In some implementations, the transaction device may determine a threat level associated with the obstruction based on the output of one or more photosensitive sensors. For example, a particular object, when placed on the display screen, may be associated with a particular luminance signature of the display screen that is detected by one or more photosensitive sensors. Accordingly, the transaction device may determine that the output of one or more photosensitive sensors indicates a particular luminance signature that is indicative of a particular object being placed on the display screen. The transaction device may then determine a threat level associated with the particular object (e.g., according to a mapping of objects to threat levels, which may be stored in memory of the transaction device). For example, the transaction device may determine that the output of one or more photosensitive sensors indicates a luminance signature indicative of a sticker on the display screen, which may be associated with a high threat level. As another example, the transaction device may determine that the output of one or more photosensitive sensors indicates a luminance signature indicative of a hand on the display screen, which may be associated with a low threat level.

In some implementations, the transaction device may determine a location of the obstruction on the display screen based on the output of one or more photosensitive sensors. For example, when an object is placed on a particular location of the display screen, one or more photosensitive sensors may detect a particular luminance signature of the display screen in a manner similar to that described above. As an example, the transaction device may determine that the output of one or more photosensitive sensors indicates a luminance signature indicative of an obstruction on an upper portion of the display screen (e.g., when a sensor positioned at the top of the display screen detects a larger change in luminance than a sensor positioned at the bottom of the display screen).

The transaction device may use the determined location of the obstruction to identify a portion of the display screen that remains usable for displaying information. Additionally, or alternatively, the transaction device may use the determined location to determine a threat level associated with the obstruction, in a manner similar to that described above. For example, the transaction device may determine that an obstruction on a portion of the display screen that is not used for displaying authentication codes is associated with a low threat level. In some implementations, the transaction device may use one or more machine learning models to identify luminance signatures, to identify obstructions or obstructed display screen locations indicated by luminance signatures, and/or to identify threat levels associated with obstructions or obstructed display screen locations.

The transaction device (e.g., using the processor) may perform one or more actions based on receiving the output indicating the change to the luminance of the display screen and/or based on determining that the output is indicative of the obstruction on the display screen, as described in more detail below. In some implementations, the transaction device may determine whether an action is to be performed based on a threat level that is determined for the obstruction and/or a location on the display screen that is determined for the obstruction. For example, the transaction device may determine not to perform an action when a threat level determined for the obstruction is relatively low (e.g., below a threshold threat level or a threshold threat score).

As shown in FIG. 1C, and by reference number 125, the one or more actions may include disabling one or more operations of the transaction device. The one or more operations may include an information displaying operation (e.g., disabling the display of information on the display screen), an account access operation (e.g., preventing a user from accessing account information via the transaction device), a data access operation (e.g., preventing a user from accessing data via the transaction device), an authentication operation (e.g., preventing the transaction device from authenticating the user device, or triggering automatic rejection of the authentication), a transaction operation (e.g., preventing the transaction device from performing a transaction in connection with a user account), a dispensing operation (e.g., preventing the transaction device from dispensing an object, such as cash or a cashier's check), and/or a depositing operation (e.g., preventing the transaction device from accepting a deposit), among other examples. Additionally, or alternatively, the one or more actions may include terminating one or more operations of the transaction device, for example, if an operation is ongoing when the output indicating the change is received and/or when it is determined that the output is indicative of the obstruction. Additionally, or alternatively, the one or more actions may include disabling one or more components of the transaction device. The one or more components may include the display screen, a keypad, a card reader, a cash dispenser, and/or a deposit component, among other examples. In some implementations, the one or more actions may include powering off the transaction device.

In some examples, after receiving the output indicating the change to the luminance of the display screen and/or determining that the output is indicative of the obstruction on the display screen, the transaction device may receive, from the user device, a request to perform an operation. For example, the operation may include authenticating the user device, accessing data, and/or executing a transaction. Here, the transaction device may deny the request based on receiving the output indicating the change to the luminance of the display screen and/or based on determining that the output is indicative of the obstruction on the display screen.

As shown by reference number 130, the one or more actions may include outputting an error message on the display screen. For example, the error message may indicate that the obstruction was detected, that one or more operations of the transaction device are disabled, and/or that one or more components of the transaction device are disabled, among other examples. In some implementations, the transaction device may output the error message on a portion of the display screen that is free of the obstruction based on determining the location of the obstruction, as described above.

As shown by reference number 135, the one or more actions may include transmitting a message to a backend system associated with the transaction device. The message may indicate that there is an obstruction on the display screen, may indicate the threat level associated with the obstruction, and/or may indicate the location of the obstruction on the display screen, among other examples. In some implementations, the one or more actions may include capturing an image of an environment of the transaction device (e.g., for use in identifying the person(s) responsible for placing the obstruction on the display screen) and/or capturing an image of the display screen (e.g., for use in identifying the obstruction). Here, the transaction device may transmit the captured image(s) to the backend system with the message.

In some implementations, the transaction device and/or the backend system may determine (e.g., using a computer vision technique) a type of the obstruction based on the image of the display screen, which may be used to determine a threat level associated with the obstruction, as described above. Additionally, or alternatively, the transaction device and/or the backend system may determine (e.g., using a computer vision technique) a location of the obstruction based on the image of the display screen, as described above. The backend system may transmit a message to the transaction device that indicates the type of the obstruction, the threat level, and/or the location.

In some implementations, the transaction device may transmit, or cause the backend system to transmit, a message, as described above, to a device associated with an owner of the transaction device, a custodian of the transaction device, or another responsible party for the transaction device. Additionally, or alternatively, the transaction device may transmit, or cause the backend system to transmit, a message to the user device that alerts the user to discontinue interactions with the transaction device. Furthermore, the transaction device may cause (e.g., via the backend system) one or more operations of the user device (e.g., of an application executing on the user device) to terminate or to be disabled. For example, the one or more operations may include an authentication operation and/or a transaction operation associated with the transaction device.

Accordingly, the obstruction on the display screen, which may be associated with fraudulent activity, may be detected by the transaction device in real time, thereby enabling immediate preventative or remedial measures to be taken. In this way, computing resources and/or network resources that may otherwise be used for fraud identification, investigation, and/or correction may be conserved. Moreover, the photosensitive sensors used by the transaction device consume relatively little power, can be integrated into a small package, and enable obstruction detection without the need for complex systems. As a result, monitoring for obstructions may be performed efficiently, and with minimal consumption of power and processing resources of the transaction device.

As indicated above, FIGS. 1A-1C are provided as an example. Other examples may differ from what is described with regard to FIGS. 1A-1C.

Figure 2:
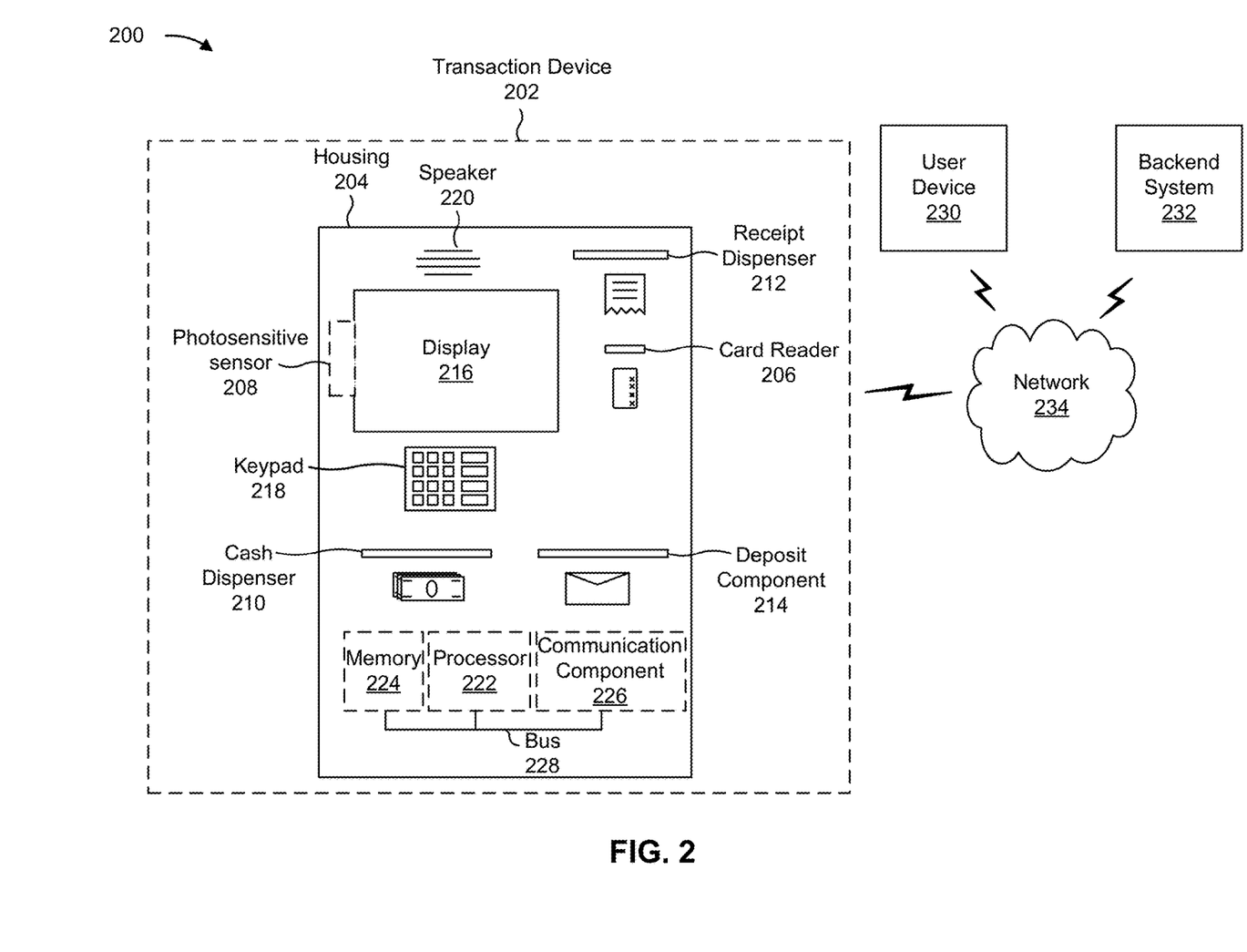
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction device 202, which may include a housing 204, a card reader 206, a photosensitive sensor 208, a cash dispenser 210, a receipt dispenser 212, a deposit component 214, a display 216, a keypad 218, a speaker 220, a processor 222, a memory 224, a communication component 226, and/or a bus 228. As further shown in FIG. 2, environment 200 may include a user device 230, a backend system 232, and/or a network 234. Devices of environment 200 may interconnect via wired connections, wireless connections, or a combination of wired and wireless connections.

Transaction device 202 includes one or more devices capable of receiving, generating, storing, processing, and/or providing information, such as information described herein. For example, transaction device 202 may include an ATM, a point of sale (POS) device, and/or a kiosk device, among other examples. An ATM may include an electronic telecommunications device that enables customers of financial institutions to perform financial transactions, such as cash withdrawals, deposits, transferring funds, and/or obtaining account information, at any time and without direct interaction with employees of the financial institutions. A POS device may include an electronic device used to process transaction card payments at retail locations. The POS device may read information from a transaction card (e.g., a credit card, a debit card, and/or a gift card), and may determine whether there are sufficient funds in an account associated with the transaction card for a transaction. The POS device may transfer funds from the account associated with the transaction card to an account of a retailer and may record the transaction. A kiosk device may include a computer terminal featuring specialized hardware and software that provides access to information and/or applications for communication, commerce, entertainment, and/or education. In some implementations, a kiosk device may include an electronic telecommunications device that enables customers of financial institutions to perform financial transactions, such as cashier's check issuances, at any time and without direct interaction with employees of the financial institutions.

The transaction device 202 may include one or more components for monitoring an output of the photosensitive sensor 208, determining that the output is indicative of an obstruction on the display 216 (e.g., a display screen), and performing one or more actions based on determining that the output is indication of the obstruction, as described herein. In some implementations, the transaction device 202 may include one or more image capture components for capturing an image of an environment of the transaction device 202.

The transaction device 202 includes a housing 204 that houses one or more components and/or portions of one or more components of the transaction device 202. The housing 204 may be constructed to prevent unauthorized access to internal components of the transaction device 202, such as storage compartments that physically store cards, currency (e.g., cash, banknotes, or cashier's checks), and/or deposits (e.g., checks)

The card reader 206 includes one or more components for reading account information from a card. For example, the card reader 206 may include a motorized card reader or another type of card reader with one or more actuators capable of ejecting or retracting a card. The card reader may include a reading component to read account information from the card (e.g., an account identifier, an expiration date), such as a magnetic stripe reader, a chip reader, a dip reader, and/or a near-field communication reader. The card may be, for example, a transaction card, an ATM card, a bank card, a credit card, and/or a debit card.

The photosensitive sensor 208 is configured to detect a degree of luminance of a viewing surface of the display 216. The photosensitive sensor 208 may be a photoresistor, a phototransistor, and/or a photodiode, among other examples. The photosensitive sensor 208 may be located at one or more edges of the display 216 or positioned in front of the viewing surface of the display 216, as described above. The photosensitive sensor 208 may be included in a sensor module, as described above. The transaction device 202 may include multiple photosensitive sensors 208.

The cash dispenser 210 includes one or more components for dispensing cash (e.g., a cashier's check) as part of a financial transaction performed using the transaction device 202. The cash dispenser 210 includes one or more actuators capable of obtaining cash from a cash storage compartment housed within the housing 204 and dispensing the obtained cash for removal by a user (e.g., from the cash dispenser 210 and/or a cash tray to which the cash is dispensed). In some implementations, the cash dispenser 210 is capable of ejecting cash, retracting cash (e.g., if the cash is not removed after a threshold amount of time), and/or providing retracted cash to a cash storage compartment (which may be the same as or different from the cash storage compartment from which the cash is obtained). In some implementations, the cash dispenser 210 includes one or more components for printing a cashier's check.

The receipt dispenser 212 includes one or more components capable of printing and dispensing a receipt (e.g., by applying ink to paper) associated with a financial transaction performed using the transaction device 202. In some implementations, the receipt dispenser 212 may be capable of ejecting a receipt, retracting a receipt (e.g., if the receipt is not removed after a threshold amount of time), and/or providing a retracted receipt to a receipt storage compartment.

The deposit component 214 includes one or more components capable of accepting a deposit inserted to the deposit component 214 by a user. In some implementations, the deposit component 214 includes a check reader (e.g., a motorized check reader) capable of reading a check and providing deposit information (e.g., a check amount, an account identifier that identifies an account from which the check amount is to be transferred) for performing a financial transaction (e.g., a deposit or funds transfer). In some implementations, the deposit component 214 includes one or more actuators capable of retracting a check (or other deposit note), ejecting a check (e.g., if the check is not valid), and/or providing a retracted check to a check storage compartment.

The display 216 includes any type of display capable of outputting information for display. For example, the display 216 may include a monitor, a screen, a touch screen, a light-emitting diode (LED) display, and/or a cathode-ray tube (CRT) display, among other examples. In some implementations, the display 216 is an edge-lit screen (e.g., touch screen), as described above.

The keypad 218 includes one or more input components that permit a user to provide input to the transaction device 202 (e.g., to the processor 222 of the transaction device 202). For example, the keypad 218 may be and/or may include a number pad, a personal identification number (PIN) pad, a keyboard, a set of buttons (e.g., mechanical buttons that use mechanical actuation or electronic buttons that use electronic actuation), and/or another type of input component. In some implementations, the keypad 218 may be integrated with the display 216, such as for a touch screen.

The speaker 220 includes any type of component capable of outputting audio and/or producing sound. For example, the speaker 220 may be and/or may include a loudspeaker, a dynamic speaker, and/or an audio amplifier, among other examples.

The processor 222, the memory 224, and the communication component 226 are described in more detail below in connection with processor 320, memory 330, and communication component 370, respectively, of FIG. 3. The bus 228 provides communicative connectivity among the processor 222, the memory 224, and the communication component 226, similar to bus 310 described below in connection with FIG. 3.

The user device 230 includes one or more devices capable of receiving, generating, storing, processing, and/or providing information, such as the information described herein. For example, the user device 230 may include a communication and/or a computing device, such as a mobile phone (e.g., a smart phone or a radiotelephone), a laptop computer, a tablet computer, a handheld computer, a gaming device, a wearable communication device (e.g., a smart wristwatch or a pair of smart eyeglasses), or a similar type of device. In some implementations, the user device 230 may transmit requests to the transaction device 202 and/or receive information from the transaction device 202. In some implementations, the user device 230 may include one or more components for scanning a visual code (e.g., a QR code) and processing the visual code.

The backend system 232 includes one or more devices capable of authorizing and/or facilitating a transaction. For example, the backend system 232 may include one or more servers and/or computers to store and/or provide information (e.g., authorizations, balances, transaction tokens, security information, and/or account information, among other examples) associated with processing a transaction via the transaction device 202.

The backend system 232 may include one or more devices associated with financial institutions (e.g., banks or credit unions) and/or transaction card associations that authorize the transaction and/or facilitate a transfer of funds or payments between an account of a user and an account of an individual or business of the transaction device 202. For example, the backend system 232 may include one or more devices of one or more issuing financial institutions associated with a cardholder of a transaction card, one or more devices of one or more acquiring financial institutions (or merchant banks) associated with the transaction device 202, and/or one or more devices associated with one or more card associations associated with a transaction card. Various financial institutions and/or card associations of the backend system 232 may communicate to authorize a transaction and/or transfer funds between accounts. In some implementations, the backend system 232 may include one or more devices or components for receiving messages from the transaction device 202, transmitting messages to the user device 230, and/or terminating or disabling operations of an application executing on the user device 230.

The network 234 includes one or more wired and/or wireless networks. For example, the network 234 may include a cellular network (e.g., a fifth generation (5G) network, a fourth generation (4G) network, a long-term evolution (LTE) network, a third generation (3G) network, or a code division multiple access (CDMA) network, among other examples), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, and/or a fiber optic-based network, among other examples, and/or a combination of these or other types of networks. The network 234 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
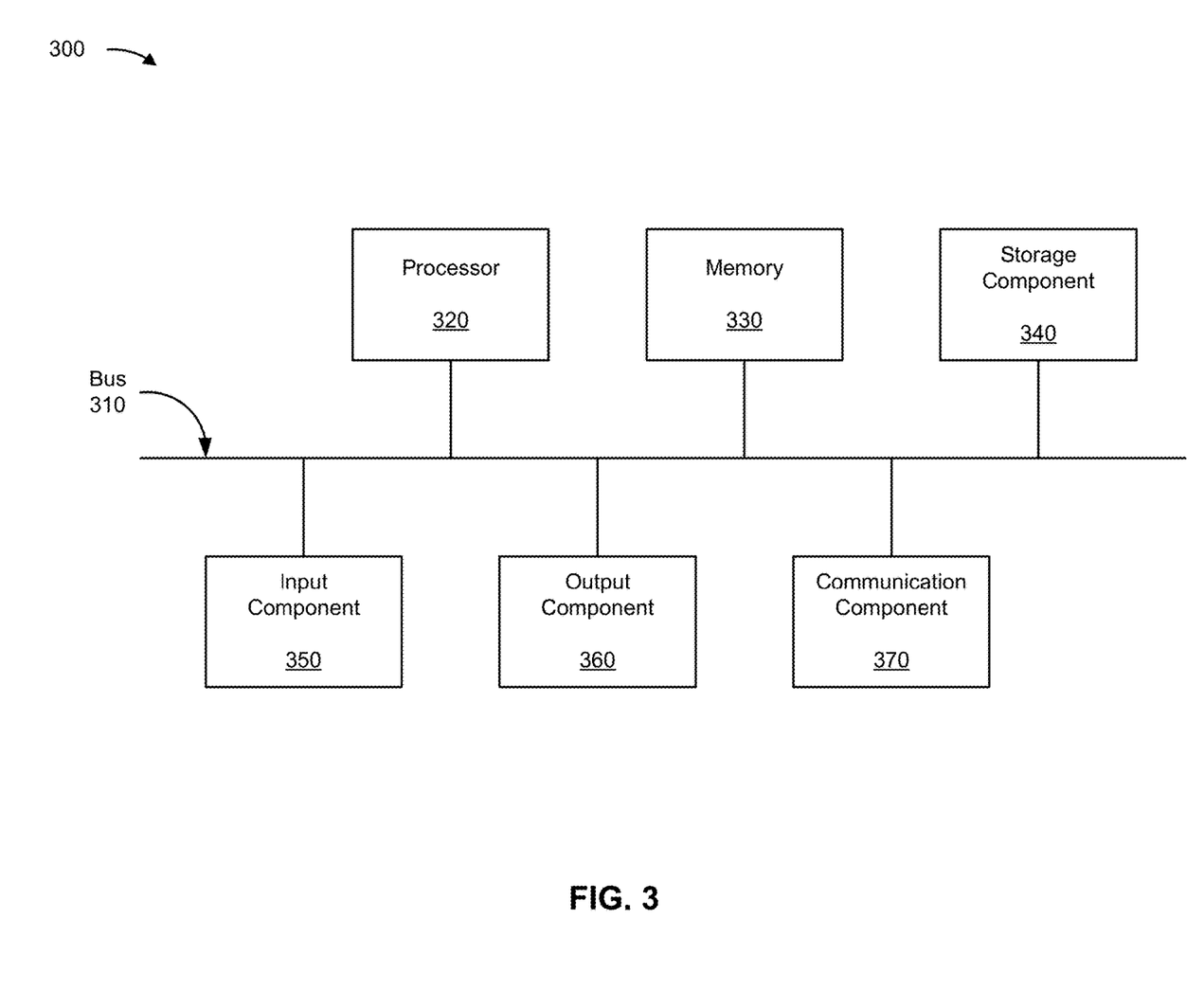
FIG. 3 is a diagram of example components of one or more devices of FIG. 2.

FIG. 3 is a diagram of example components of a device 300, which may correspond to transaction device 202, user device 230, and/or a device of backend system 232. In some implementations, transaction device 202, user device 230, and/or a device of backend system 232 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
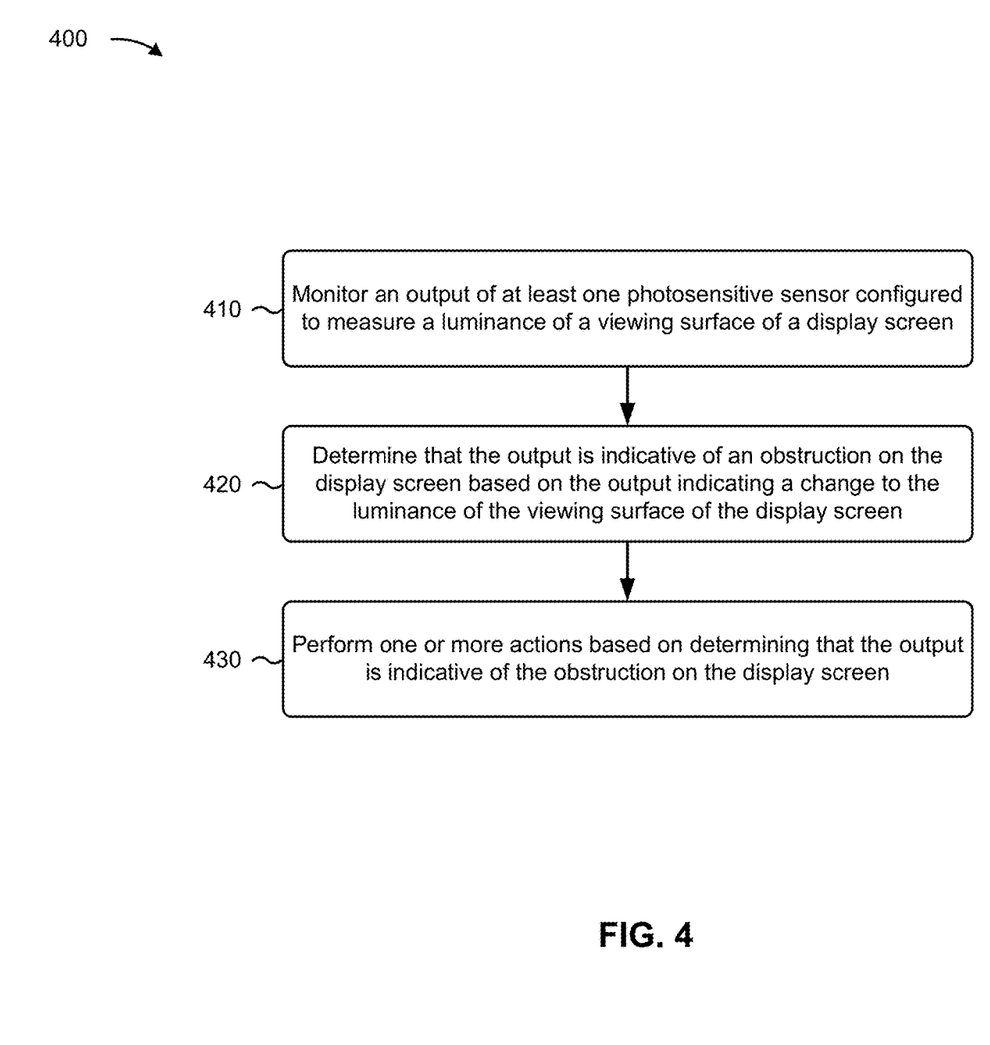
FIG. 4 is a flowchart of an example process relating to obstruction detection of a transaction device display screen.

FIG. 4 is a flowchart of an example process 400 associated with obstruction detection of a transaction device display screen. In some implementations, one or more process blocks of FIG. 4 may be performed by a transaction device (e.g., transaction device 202). In some implementations, one or more process blocks of FIG. 4 may be performed by another device or a group of devices separate from or including the transaction device, such as user device 230 and/or backend system 232. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include monitoring an output of at least one photosensitive sensor configured to detect a luminance of a viewing surface of a display screen (block 410). As further shown in FIG. 4, process 400 may include determining that the output is indicative of an obstruction on the display screen based on the output indicating a change to the luminance of the viewing surface of the display screen (block 420). As further shown in FIG. 4, process 400 may include performing one or more actions based on determining that the output is indicative of the obstruction on the display screen (block 430).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transaction device capable of obstruction detection, the transaction device comprising:
   a display screen;
   at least one photosensitive sensor configured to detect a luminance of a viewing surface of the display screen; and
   one or more processors configured to:
      monitor an output of the at least one photosensitive sensor;
      determine that the output is indicative of an obstruction on the display screen based on the output indicating a change to the luminance of the viewing surface of the display screen; and
      disable one or more operations of the transaction device based on determining that the output is indicative of the obstruction on the display screen.

2. The transaction device of claim 1, wherein the display screen is an edge-lit display screen.

3. The transaction device of claim 1, wherein the at least one photosensitive sensor is disposed on at least one edge of the display screen.

4. The transaction device of claim 1, wherein the at least one photosensitive sensor is positioned in front of the viewing surface of the display screen.

5. The transaction device of claim 4, further comprising an arm having a distal end directed toward the viewing surface of the display screen,
   wherein the at least one photosensitive sensor is disposed on the distal end of the arm.

6. The transaction device of claim 1, wherein the one or more processors are further configured to:
   receive a request to authenticate a user device; and
   cause the display screen to display a code used for authentication of the user device.

7. The transaction device of claim 1, wherein the one or more processors are further configured to:
   receive a request to perform an operation; and
   deny the request based on determining that the output is indicative of the obstruction on the display screen.

8. The transaction device of claim 7, wherein the operation comprises one or more of:
   authenticating a user device,
   accessing data, or
   executing a transaction.

9. A method of obstruction detection, comprising:
   monitoring, by a device, an output of at least one photosensitive sensor configured to detect a luminance of a viewing surface of a display screen of the device;
   determining, by the device, that the output is indicative of an obstruction on the display screen based on the output indicating a change to the luminance of the viewing surface of the display screen; and performing, by the device, one or more actions based on determining that the output is indicative of the obstruction on the display screen.

10. The method of claim 9, wherein the display screen is an edge-lit display screen.

11. The method of claim 9, wherein the luminance of the viewing surface of the display screen is a luminance of reflected light in the display screen.

12. The method of claim 9, wherein the luminance of the viewing surface of the display screen is a luminance of light emitted from the display screen.

13. The method of claim 9, wherein the change to the luminance satisfies a threshold value.

14. The method of claim 9, further comprising:
receiving a request to perform an operation; and
denying the request based on determining that the output is indicative of the obstruction on the display screen.

15. The method of claim 14, wherein the operation comprises one or more of:
authenticating a user device,
accessing data, or
executing a transaction.

16. The method of claim 9, wherein performing the one or more actions comprises one or more of:
disabling one or more operations of the device,
disabling one or more components of the device,
transmitting a message indicating the obstruction on the display screen,
capturing an image of an environment of the device, or
outputting an error message on the display screen.

17. A non-transitory computer-readable medium storing a set of instructions, the set of instructions comprising:
one or more instructions that, when executed by one or more processors of a device, cause the device to:
receive, from at least one photosensitive sensor configured to detect a luminance of a viewing surface of a display screen, information indicating a change to the luminance of the viewing surface of the display screen; and
disable one or more operations of the device based on receiving the information indicating the change to the luminance.

18. The non-transitory computer-readable medium of claim 17, wherein the display screen is an edge-lit display screen.

19. The non-transitory computer-readable medium of claim 17, wherein the change to the luminance of the viewing surface is relative to a baseline luminance for the viewing surface.

20. The non-transitory computer-readable medium of claim 17, wherein the one or more instructions, when executed by the one or more processors, further cause the device to:
disable one or more components of the device,
transmit a message indicating an obstruction on the display screen,
capture an image of an environment of the device, or
output an error message on the display screen.

* * * * *